United States Patent [19]

Nakano et al.

[11] Patent Number: 4,858,224

[45] Date of Patent: Aug. 15, 1989

[54] DIAGNOSTIC METHOD OF EQUIPMENT AND SYSTEM USING THE SAME

[75] Inventors: Yukio Nakano, Hachioji; Tadayuki Kanno, Yokohama, both of Japan

[73] Assignee: Hitachi, Ltd., Tokyo, Japan

[21] Appl. No.: 140,791

[22] Filed: Jan. 5, 1988

[30] Foreign Application Priority Data

Jan. 9, 1987 [JP] Japan ................................... 62-1847

[51] Int. Cl.⁴ ............................................... H04J 3/14
[52] U.S. Cl. ........................................ 370/16; 370/13
[58] Field of Search ............... 370/16, 13, 14; 371/11, 371/22

[56] References Cited

U.S. PATENT DOCUMENTS 3,909,562  9/1975  Lager ..................................... 370/13
4,266,293  5/1981  Amderson et al. .................... 370/16
4,302,836  11/1981  Bouvier d'Ivoire et al. ......... 370/13

OTHER PUBLICATIONS

"Digital Synchronous Terminal System for Inter-City Network: Series 2", pp. 95–106 of the Japanese Periodical Shisetsu (Facilities) vol. 33, No. 11.

"Digital Exchange Method", Directed by Chiba, The Institute of Electronics and Communication Engineers of Japan, pp. 42–44 (1986).

Primary Examiner—Douglas W. Olms
Attorney, Agent, or Firm—Antonelli, Terry & Wands

[57] ABSTRACT

In a digital switching equipment or a digital cross-connect equipment including a plurality of receiving circuits, a multiplexer, a time division switch, a demultiplexer, and a plurality of transmitting circuits, each of the receiving circuits or the multiplexer has a circuit to insert a specific sequence into filling time slots of a plurality of subhighways of a highway having a plurality of time slots and each of the transmitting circuits and the demultiplexer has a circuit to detect the specific sequence inserted into the filling time slots such that when either one of the error detect circuits detects an error, a route change of the filling time slots is accomplished by means of a time division switch so as to predict a location of occurrence of a failure depending on a change in a detection state of the error detect circuits in association with the route change.

3 Claims, 5 Drawing Sheets

FIG. I

DIAGNOSTIC METHOD OF EQUIPMENT AND SYSTEM USING THE SAME

BACKGROUND OF THE INVENTION

The present invention relates to a diagnostic method of equipment and a system using the same for separating a failed portion in a communication line apparatus such as a digital switching equipment or a digital cross-connect equipment.

In a digital switching equipment or a digital cross-connect equipment, when a failure occurs in the equipment, a diagnosis of the equipment is effected to separate the failed portion thereof. For example, as described in the "Digital Synchronous Terminal System for Inter-City Network: <Series 2>" on pages 95–106 of the Japanese periodical "Shisetsu (Facilities)", Vol. 33, No. 11, there has been a method of separating a failed highway in which filling time slots on highways are utilized to insert and to check test signals in the equipment. The diagnostic method will now be described with reference to a block diagram of FIG. 4 and a flowchart of FIG. 5.

As can be seen from FIG. 4, the diagnostic method is applied to an equipment comprising a time division switch 1, a multiplexer 2, a demultiplexer 3, receiving circuits 4-5 respectively including test signal generators 11-12, transmitting circuits 6-7 respectively including error detection circuits 13-14, a switch controller 8, and an equipment diagnostic section 9. In the receiving circuits 4-5, input signals received are converted into sub-highway frames suitable for switching operations and inserts a specific pattern generated by the test signal generator 11 or 12 into a filling time slot, thereby delivering the resultant signals to the multiplexer 2. The multiplexer 2 effects a multiplexing operation on two sub-highways to configure a high-way, thereby outputting the signals to the time division switch 1. The time division switch 1 exchanges the time slot of the primary signal under the control of the switch controller 8. The time slot into which the test signal is inserted is not to be exchanged or to be exchanged constantly. In the demultiplexer 3, the highway is demultiplexer into two sub-highways again. The transmitting circuits 6-7 output primary signals to external devices and checks at the same time the test signal on the filling time slot by means of the error detection circuits 13-14. An error thus detected here is sent to the equipment diagnostic section 9. In the equipment diagnostic section 9, as shown in the flowchart of FIG. 5, when an error is detected, the location where the error has occurred is predicted depending on a combination of error detecting positions.

For example, assume that an output from the test signal generator 11 is fixedly connected to the error detection circuit 13 and that an output from the test signal generator 12 is fixedly fed to the error detection circuit 14. If the error detection circuit 13 detects an error and the error detection circuit 14 does not detect an error, the equipment diagnostic section 9 recognizes that the error has occurred in a sub-highway interval, namely, in an interval between the receiving circuit 4 and the multiplexer 2 or between the demultiplexer 3 and the transmitting circuit 6. Furthermore, in the case where the error detection circuits 13-14 respectively detect errors, the equipment diagnostic section 9 judges that the failure has occurred in a highway interval, namely, in an interval between the multiplexer 2 and the demultiplexer 3.

In this method, since the filling time slot into which the test signal is inserted is fixedly connected as described above, the number of error detection points must be increased to improve the precision of the separation of the failed portion.

SUMMARY OF THE INVENTION

It is therefore an object of the present invention to provide a diagnostic method of equipment in which the separation of the failed portion is effected with a high precision by using a reduced number of error detecting points.

The object above is achieved in the following manner. When an error is detected in one of the error detect circuits, a route change of a filling time slot is carried out by means of a time division switch such that depending on a change in an error detection state in the error detection circuit in association with the route change, the location where the error has occurred is predicted.

When an error is detected in one of the error detection circuits, a route change of a filling time slot is achieved by means of a time division switch; consequently, the error detection points vary according to the route change, and a different change takes place in the error detection points depending on the location of the failure, which enables to predict in detail the location where the failure has occurred.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Referring now to the accompanying drawings, an embodiment of the present invention will be described.

Figure 1:
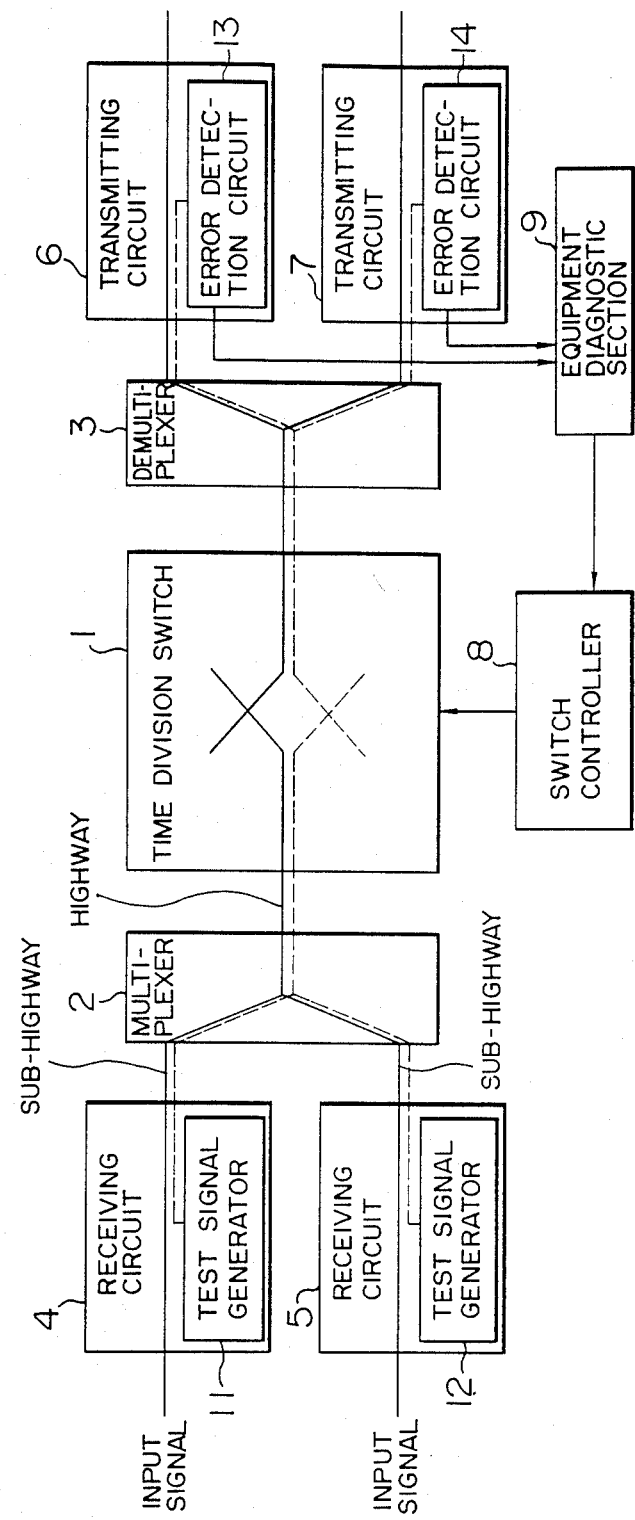
FIG. 1 is a block diagram schematically showing an embodiment of the diagnostic method of equipment according to the present invention.
Figure 2:
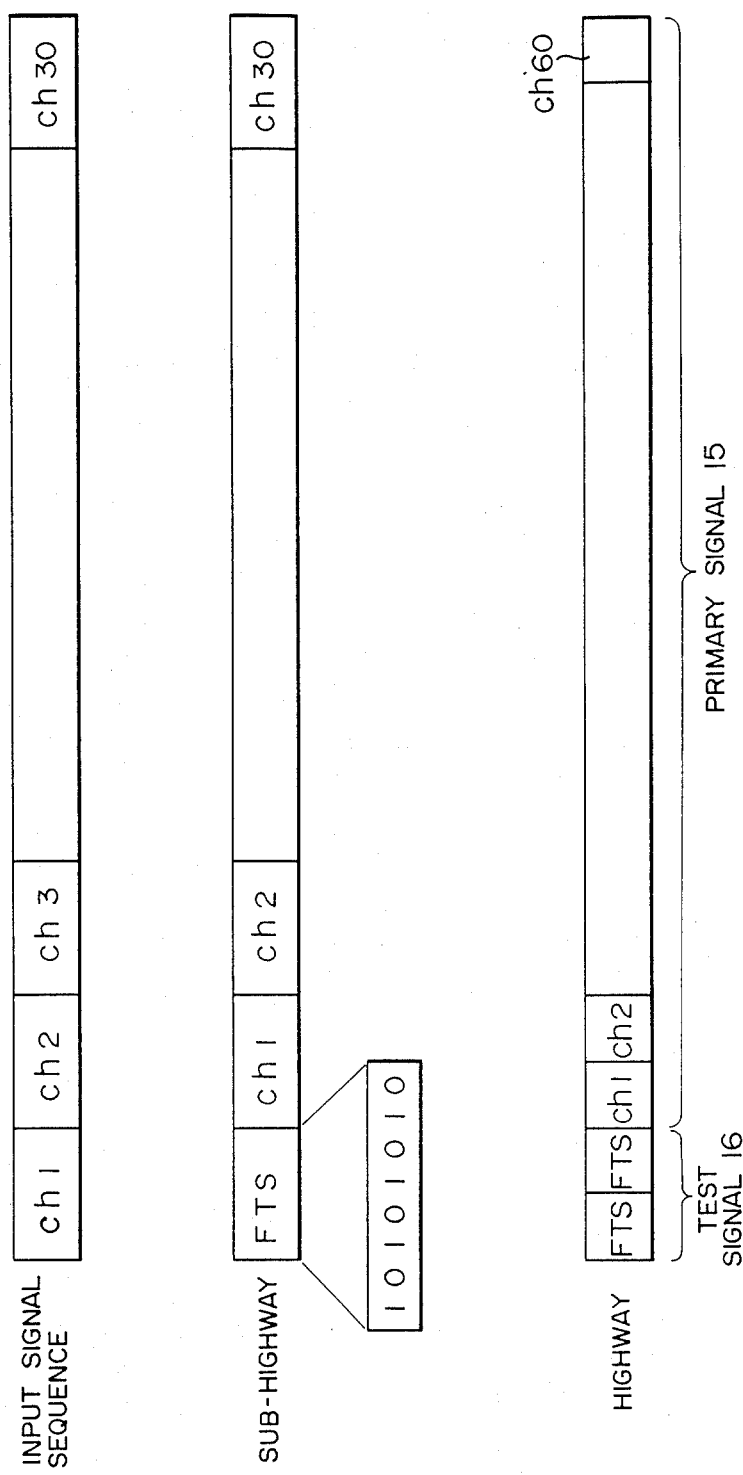
FIG. 2 is a schematic diagram illustrating signals of the respective positions of the configuration of FIG. 1.

The block diagram of FIG. 1 includes a time division switch 1 capable of switching the time slots of the primary signal and the filling time slot (FTS), a multiplexer 2, a demultiplexer 3, receiving circuits 4-5 respectively including test signal generators 11-12, transmitting circuits 6-7 respectively including error detection circuits 13-14, a switch controller 8, and an equipment diagnostic section 9. Incidentally, in FIG. 2, the channel group of respective signals indicates a primary signal and the group of FTS designates an FTS test signal 16.

Excepting the operation of the time division switch 1, the operation of this system is the same as that of the conventional example described above, namely, the receiving circuits 4-5 convert input signals or input sequences into a sub-highway frame or a frame format of sub-highway and at the same time inserts a specific pattern or a specific sequence generated by the test signal generators 11 and 12 into filling time slot on the frame format of each sub-highway so as to output the obtained signals to the multiplexer 2. The multiplexer 2 multiplexes two sub-highways to configure a highway, which is then delivered therefrom.

The time division switch 1 effects an exchange of time slots for the primary signal or the information sequence (time slots) and the test signal or the test sequence (time slots) under control of the switch controller 8. This operation of the time division switch 1 may be effected by use of a time switch (T switch) described in the "Digital Exchange Method", directed by Chiba, the Institute of Electronics and Communication Engineers of Japan, pp. 42–44 (1986). The demultiplexer 3 demultiplexes the highway into two sub-highways. The transmitting circuits 6-7 output the information sequences 15 to external devices and at the same time check the test signals 16 on the filling time slots by means of the error detection circuits 13-14, respectively. The error detected here is sent to the equipment diagnostic section 9, which comprises a micro-processor, for example.

Figure 3:
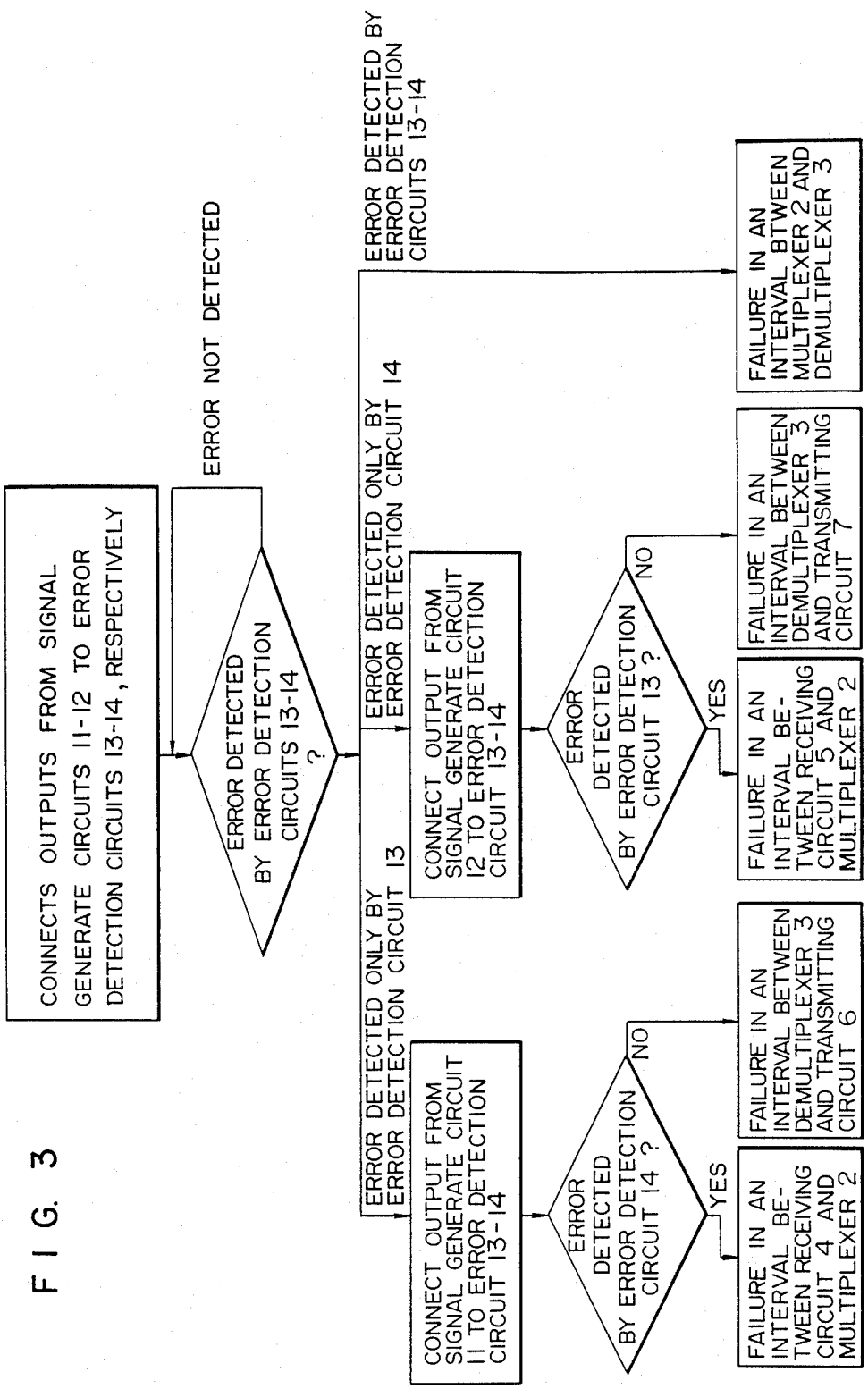
FIG. 3 is a flowchart depicting a diagnosis of equipment in the embodiment of FIG. 1.
Figure 4:
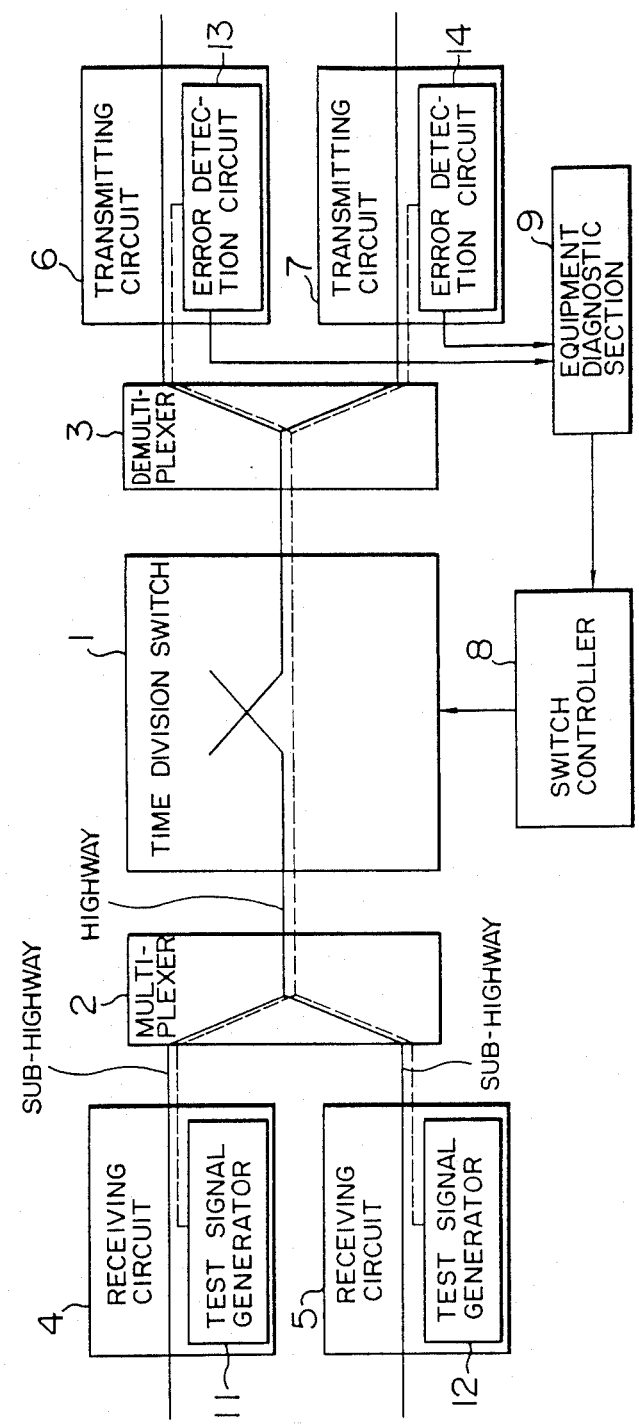
FIG. 4 is a schematic diagram showing the conventional diagnostic method of equipment.
Figure 5:
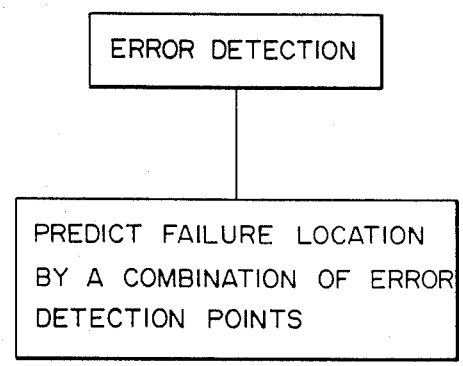
FIG. 5 is flowchart illustrating the diagnosis of equipment according to the conventional diagnostic method.

Referring next to the flowchart of FIG. 3, a description will be given of the operational procedure of the equipment diagnostic section 9. When the equipment is normal, the error detection circuits 13-14 keep checking the outputs respectively delivered from the signal generating circuits 11-12 which are coupled to the error detection circuits 13-14, respectively. When a failure occurs in the equipment, the error is detected by either one of or both of the error detection circuits 13-14 depending on the position of the error. For example, if the error detection circuit 13 detects an error and the error detection circuit 14 does not detect the error, the possible error location or the candidate of the error position is limited to a sub-highway interval between the receiving circuit 4 and the multiplexer 2 or between the demultiplexer 3 and the transmitting circuit 6. The equipment diagnostic section 9 then causes the switch controller 8 to operate the time division switch 1 so as to connect the output from the signal generator circuit 11 to both of the error detection circuits 13-14 and thereafter effects the check again on the error detection circuits 13-14. If an error is detected by both of the error detection circuits 13-14 as a result, the failure is judged to have occurred in an interval between the receiving circuit 4 and the multiplexer 2. Furthermore, if the error is detected only by the error detection circuit 13 after the operation of the time division switch 1, the equipment diagnostic circuit 9 recognizes that the failure has taken place in an interval between the demultiplexer 3 and the transmitting circuit 6. Assume next that an error is detected by the error detection circuit 14 and the error is not detected by the error detection circuit 13 in a state where the error detection circuits 13-14 are continuously being checked. In this situation, the possible error location or the candidate of the error position is limited to an interval between the receiving circuit 5 and the multiplexer 2 or between the demultiplexer 3 and the transmitting circuit 7. The equipment diagnostic circuit 9 therefore causes the switch controller 8 to operate the time division switch 1 so as to connect the output from the signal generator circuit 12 to both of the error detection circuits 13-14 and thereafter effects the check again on the error detection circuits 13-14. If an error is detected by both of the error detection circuits 13-14 as a result, the failure is judged to have occurred in an interval between the receiving circuit 5 and the multiplexer 2. Furthermore, if the error is detected only by the error detection circuit 14 after the operation of the time division switch 1, the equipment diagnostic circuit 9 recognizes that the failure has taken place in an interval between the demultiplexer 3 and the transmitting circuit 7. On the other hand, if an error is detected by the error detection circuits 13-14 in a state where the error detection circuits 13-14 are continuously being checked, the failure is judged to have occurred in an interval between the multiplexer 2 and the demultiplexer 3.

Incidentally, although the description has been given of the case where a pair of receiving circuits 4-5 and a pair of transmitting circuits 6-7 are included in the embodiment, the present invention is not restricted by the embodiment and is naturally applicable to the case where each of the sets of the receiving circuits and transmitting circuits includes three or more units thereof.

According to the present invention, as described above, there is provided a diagnostic method in a digital switching equipment or a digital cross-connect equipment including a plurality of receiving circuits, a multiplexer, a time division switch, a demultiplexer, and a plurality of transmitting circuits wherein each of said receiving circuits or said multiplexer is provided with a circuit to insert a specific sequence into filling time slots on a highway and each of said transmitting circuits or said demultiplexer is provided with a circuit to detect the specific sequence inserted into the filling time slots such that when either one of said error detection circuits detects an error, a route change of the filling time slots is accomplished by means of said time division switch so as to predict a location of an occurrence of a failure depending on a change in a detection state of said error detect circuits in association with the route change, thereby attaining a high accuracy in a separation of the failure.

While the present invention has been described with reference to the particular illustrative embodiments, it is not restricted by those embodiments but only by the appended claims. It is to be appreciated that those skilled in the art can change and modify the embodiments without departing from the scope and spirit of the present invention.

We claim:

1. A diagnostic method in a line equipment including a plurality of receiving circuits for receiving respective input signals and for converting the input signals into a plurality of sub-highways, a multiplexer connected to said plurality of receiving circuits for multiplexing the sub-highway to configure a highway having a plurality of time slots, a time division switch connected to said multiplexer for exchanging time slots of an information sequence including said highway, a demultiplexer connected to said time division switch for demultiplexing said highway outputted from said time division switch into a plurality of sub-highways, and a plurality of transmitting circuits connected to said demultiplexer for respectively transmitting said sub-highways, comprising the steps of:

providing each of said receiving circuits with a circuit for inserting a specific sequence into filling time slots of a corresponding sub-highway;

exchanging, by said time division switch, each filling time slot over a specific route in accordance with said specific sequence inserted therein;

providing each of said transmitting circuits with an error detection circuit for detecting whether an error exists in said specific sequence inserted into filling time slots supplied by a specific route, wherein each of said error detection circuits are connected to a specific route by said time division switch;

effecting, when one of said error detection circuits detects an error, a route change of the filling time slots supplied thereto by said time division switch; and predicting a location of occurrence of a failure depending on a change in a detection state of said error detection circuits in association with said route change.

2. A method according to claim 1, wherein said specific route is connected to said error detection circuit in accordance with said specific sequence inserted into said filling time slots.

3. A diagnostic system of a line equipment including a plurality of receiving means for receiving respective input signals so as to convert the input signals into a plurality of sub-highways suitable for a switching operation, multiplex means for multiplexing said plurality of sub-highways to configure a highway, switch means for exchanging time slots of an information sequence constituting said highway, means for demultiplexing said highway outputted from said switch means into a plurality of sub-highways, and transmitting means for respectively transmitting said sub-highways, comprising:

a plurality of test signal generators for inserting a specific sequence into filling time slots of a frame format of the sub-highway converted by each receive means;

a plurality of error detection means for checking said specific sequence inserted into the filling time slots of the frame format of the sub-highway received by each transmitting means;

diagnostic means for receiving a detection signal from each of said error detection means to determine an interval where failure has occurred; and switch control means for exchanging the filling time slots of said switch means depending on an output from said diagnostic means.

* * * * *